J. P. MILLER.
AUTOMOBILE SAFETY BOX.
APPLICATION FILED AUG. 4, 1916.
1,251,806.
Patented Jan. 1, 1918.
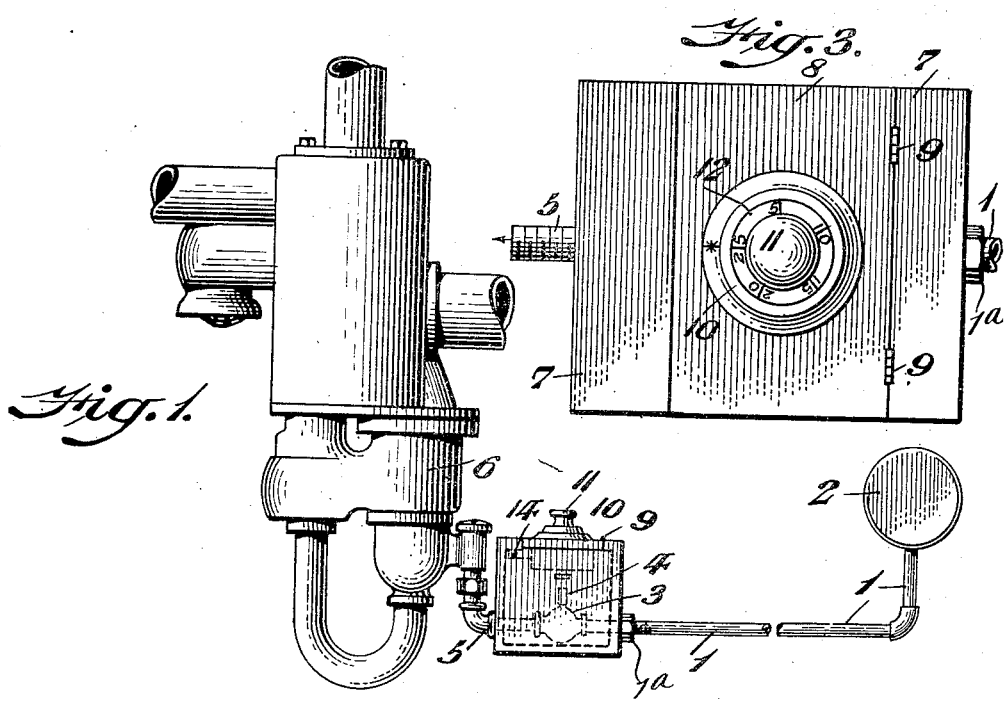
WITNESSES
INVENTOR
Joseph P. Miller
BY
ATTORNEYS

UNITED STATES PATENT OFFICE.

JOSEPH P. MILLER, OF PHILADELPHIA, PENNSYLVANIA, ASSIGNOR OF ONE-HALF TO ELLEN MILLER, OF PHILADELPHIA, PENNSYLVANIA.

AUTOMOBILE SAFETY-BOX.

1,251,806.     Specification of Letters Patent.     Patented Jan. 1, 1918.

Application filed August 4, 1916. Serial No. 113,066.

*To all whom it may concern:*

Be it known that I, JOSEPH P. MILLER, a citizen of the United States, residing in the city and county of Philadelphia, State of Pennsylvania, have invented a new and useful Automobile Safety-Box, of which the following is a specification.

My invention relates to a novel construction in an automobile of a safety appliance or device for preventing the theft of the automobile, the said construction being adapted to be carried by or secured in any suitable manner to or in proximity to the gasolene pipe leading from the gasolene tank to the carbureter of an automobile or other self propelled vehicle, the object of my invention being to provide an inclosing box or case for the cock or valve in the gasolene pipe controlling the flow of gasolene to the carbureter, said box being provided with a cover, lid or other suitable closure equipped preferably with a combination lock, the combination of which will be known only to the driver, owner or user of the machine, whereby the driver of the automobile upon stopping and temporarily leaving the same has only to unlock the box cover, turn the gasolene valve or cock so as to stop the supply of gasolene to the machine and then lock the device. Upon returning to the machine it is only necessary for the owner or driver to unlock the box, turn on the gasolene and relock the box, whereupon the engine can be started. As it will be evident that the engine of the automobile will be inoperative while the supply of gasolene is shut off, it will be apparent that I have devised a new, useful and conveniently manipulated appliance for effectually preventing the theft of automobiles which is so prevalent at the present time.

To the above ends, my invention consists of a novel box or casing for the valve or cock of the pipe which conveys gasolene from the supply tank to the carbureter of the automobile, in combination with a lid or cover therefor, which is provided with a suitable locking device, preferably a combination lock of the kind usually employed in safes.

Other novel features of my invention will hereinafter more fully appear in the detailed description of my invention.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of an automobile safety box embodying my invention, showing one manner of applying the same to protect the valve in the pipe which conveys gasolene to the carbureter.

Fig. 2 represents a sectional view of the box or inclosure for the gasolene valve or cock showing also the cover and the locking means therefor.

Fig. 3 represents a plan view of the box or closure.

Similar numerals of reference indicate corresponding parts in the figures.

Referring to the drawings.

1 designates a gasolene pipe which conveys gasolene from the tank 2 to the valve or cock 3 which may be of any usual or conventional type and provided with a finger piece 4 for convenient manipulation, said valve having a pipe 5 leading therefrom to the carbureter 6.

At 1ᵃ the pipe 1 is provided with a nut threaded thereon, as shown. The pipe 5 includes a flanged elbow, as shown in Fig. 1.

7 designates a box or inclosing casing of metal or similar material through which the pipes 1 and 5 pass which may be of rectangular or other shape, the essential feature being that the valve or cock 3 is entirely contained within and protected by said box 7. 8 designates the lid or cover of the box which is hinged to the top at the point 9 and is preferably provided with a combination lock mechanism 10, the same comprising the bolt 14, the bolt actuating mechanism in the casing 13, the dial 12 and the knob 11 for turning said dial. I deem it unnecessary to describe in detail the construction of the combination lock, as any suitable lock, such as commonly employed upon a safe may be used, the parts 11, 12, 13 and 14 constituting the conventional elements of a combination lock of the character referred to. The salient feature of my invention is the location of the box or casing with respect to the gasolene cock or valve 3 in substantially the manner shown in Figs. 1 and 2, whereby the said cock or valve is accessible only to the owner or driver of the automobile or some person properly authorized who may know the combination of the lock 10.

It will be observed that the box 7 is capable of being moved on the pipe 5 jam up against the lower flange of the elbow, Fig. 1; also that the nut 1ª is adapted to hold the box 7 against turning with respect to the said elbow and this without interfering with the centering of the cock 3 which connects the pipes 1 and 5, within the box and immediately below the combination lock mechanism carried on the lid of the box.

When the automobile engine is running, it will be apparent that the valve or cock 3 is open, as indicated in Fig. 2, whereby the flow of gasolene from the tank 2 to the carbureter 6 is free and unobstructed, the cover 8 being in locked position as indicated in Fig. 2.

When the owner or driver of the automobile temporarily leaves the machine after stopping the engine, he rotates the knob 11, thereby withdrawing the bolt 14, when the proper combination is reached, whereupon the cover 5 can be raised and the finger piece 4 of the gasolene valve turned into the position seen in Fig. 1, so that the flow of the gasolene from the tank 2 to the carbureter is stopped. The cover is then shut down, as seen in Fig. 1, and locked, the bolt 14 being actuated by means of the knob 11, and the driver or owner of the automobile can then leave the same without any liability of the same being stolen, since as the supply of gasolene is shut off from the carbureter and the gasolene valve locked, as shown in Fig. 1, and inaccessible to any person not knowing the combination of the lock 11, it is obvious that the machine cannot be started or stolen.

It will be apparent that while any suitable kind of a lock may be employed, I preferably use a combination lock of the character stated, and it will also be apparent to those skilled in the art that the box which covers and protects the valve or cock 3 may be supported within the hood of the automobile by straps or brackets or in any other suitable or desired manner and that any suitable or conventional type of combination lock 10 may be employed.

It will be apparent from the foregoing that by my invention, I have provided a simple and convenient device which will effectively protect the gasolene valve in the gasolene pipe leading from an automobile tank to its carbureter, so that the automobile owner will be effectively protected from theft under all conditions.

My invention is also useful to prevent the unauthorized use of an automobile by a chauffeur, unknown to the owner of the car, since it is evident that the owner of the car after putting the same in the garage can readily shut off the gasolene supply and lock the safety box and when the combination of the lock is known only to the owner, it will be evident that no other person than the owner can get access to the gasolene valve to open it.

It will now be apparent that I have devised an automobile safety box which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

The combination of a gasolene tank, a pipe leading therefrom, a carbureter, a pipe complementary to the first-named pipe, a flanged elbow connecting the second-named pipe with the carbureter, cut-off means interposed between and connecting said pipes, a case surrounding the cut-off means and slidably mounted on said pipes and abutting the flanged elbow, a lid on the case and carrying a lock for securing the lid in closed position, a nut threaded on the first named pipe and adapted to hold the case against turning with respect to the elbow.

JOSEPH P. MILLER.

Witnesses:
E. HAYWARD FAIRBANKS,
ELLEN MILLER.

Copies of this patent may be obtained for five cents each, by addressing the "Commissioner of Patents, Washington, D. C."